No. 762,663. PATENTED JUNE 14, 1904.
J. T. SMITH.
HAY GATHERER AND LOADER.
APPLICATION FILED OCT. 29, 1903.
NO MODEL. 3 SHEETS—SHEET 3.
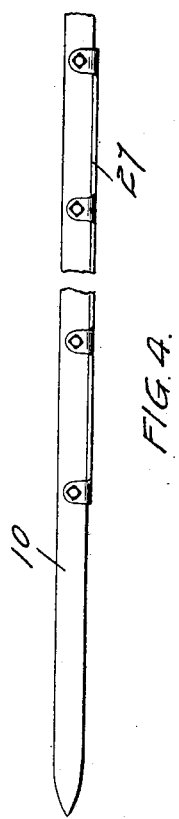
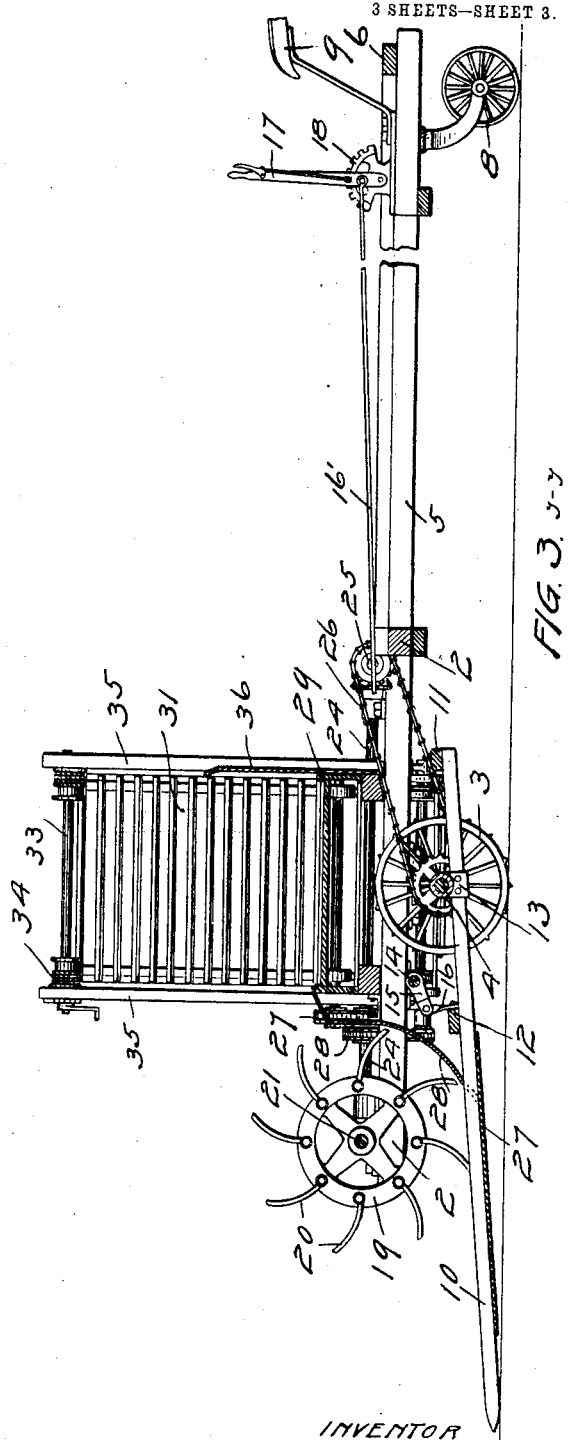
INVENTOR
JOHN T. SMITH
BY Paul & Paul
HIS ATTORNEYS
WITNESSES No. 762,663. Patented June 14, 1904.

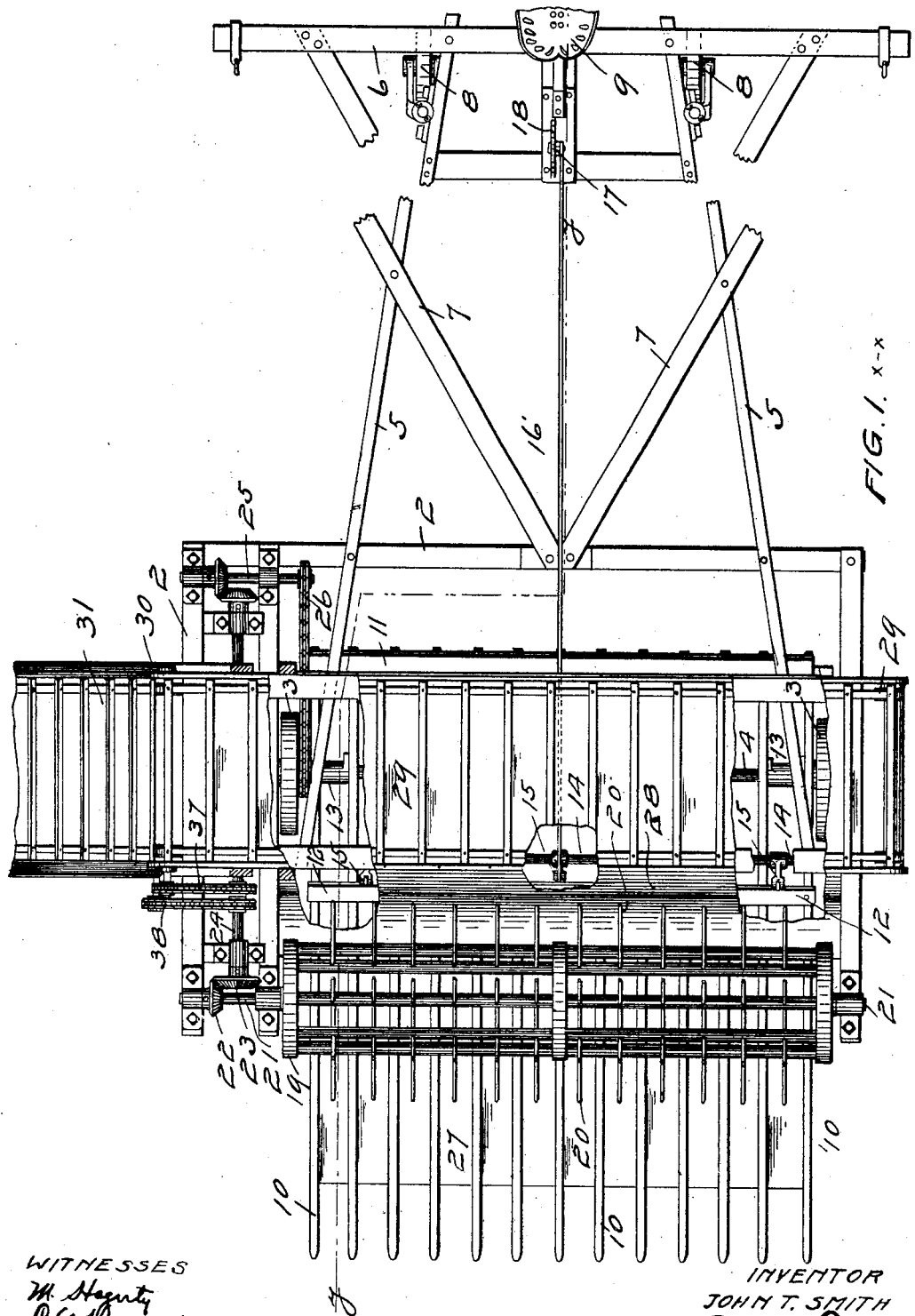

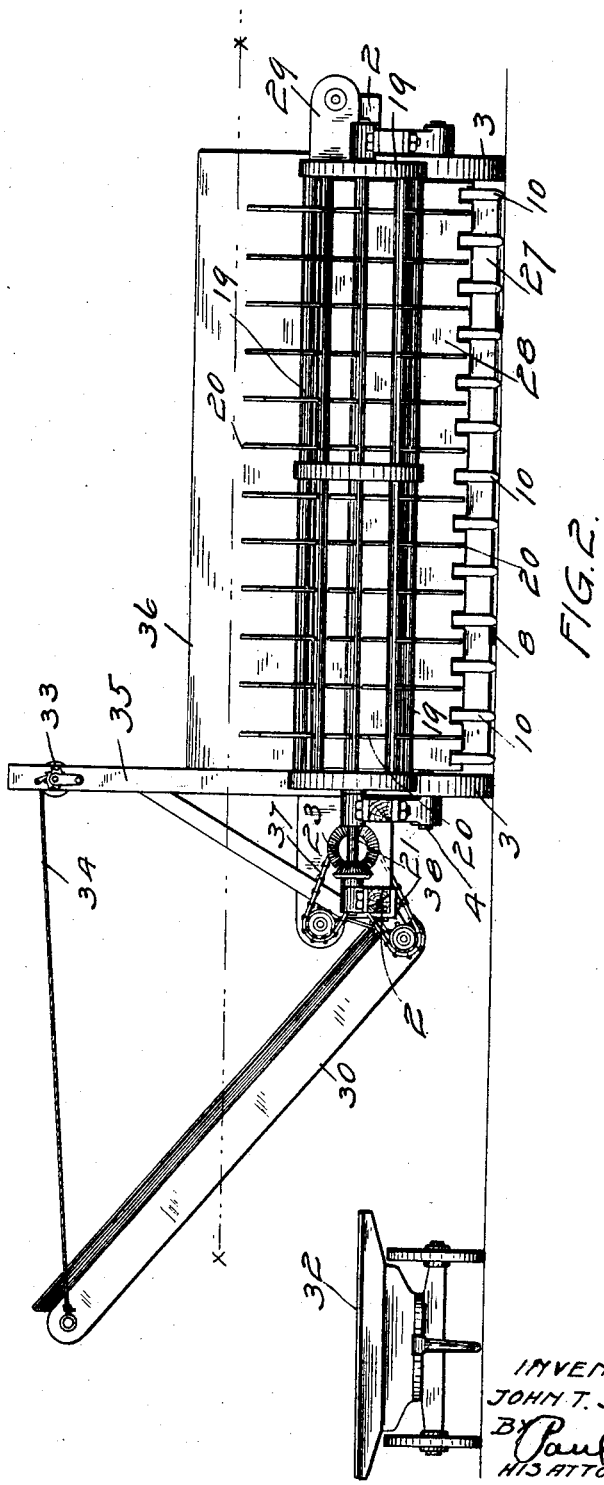

UNITED STATES PATENT OFFICE.

JOHN T. SMITH, OF HERON LAKE, MINNESOTA.

HAY GATHERER AND LOADER.

SPECIFICATION forming part of Letters Patent No. 762,663, dated June 14, 1904.

Application filed October 29, 1903. Serial No. 179,017. (No model.)

*To all whom it may concern:*

Be it known that I, JOHN T. SMITH, of Heron Lake, Jackson county, Minnesota, have invented certain new and useful Improvements in Hay Gatherers and Loaders, of which the following is a specification.

My invention relates to agricultural implements; and the object of the invention is to provide an apparatus for gathering up hay and grain loose or in bundles and lying in a swath or windrow and delivering the same to a wagon or other receptacle.

A further object is to simplify and improve the apparatus shown and described in Letters Patent of the United States No. 734,985, issued to me on July 28, 1903.

The invention consists generally in various constructions and combinations, all as hereinafter described, and particularly pointed out in the claims.

In the accompanying drawings, forming part of this specification, Figure 1 is a plan section of a gathering and loading apparatus embodying my invention, substantially on the line $x\ x$ of Fig. 2. Fig. 2 is a front view of the apparatus. Fig. 3 is a section on the line $y\ y$ of Fig. 1. Fig. 4 is a detail of the rake-head or sweep.

In the drawings, 2 represents a suitable frame having wheels 3 upon an axle 4. Bars 5 extend backwardly from the forward portion of said frame to a draft-bar 6, and braces 7 connect the outer ends of said draft-bar with the middle portion of the frame 2 at the rear side thereof. Carrying-wheels 8 are provided near the draft-bar 6 to support the same and the rear portion of the machine-frame. A seat 9 for the driver is preferably provided near the draft-bar 6. This frame construction is an ordinary one, and I make no claim to novelty therein.

A rake or sweep comprising a series of teeth 10 and cross-bars 11 and 12, connecting the same, is arranged below the axle and hinged thereon by means of brackets or straps 13, the greater portion of said teeth being in advance of said axle, and consequently tending to swing down and rest upon the ground. A rock-shaft 14 is transversely arranged above the teeth 10, provided with a series of crank-arms 15, that are pivotally connected by links 16 with the cross-bar 12. I prefer to provide three of these crank-arms, one at each end and one in the middle of the shaft, and connecting the middle arm by a rod 16' with an operating-lever 17, provided near the seat 9 and having the usual locking-latch to engage the teeth of a quadrant 18. By means of this lever the operator can raise or lower the forward ends of the rake-teeth, according to the material that is being gathered or the character of the ground over which the machine is being moved.

Mounted upon the frame 2 above the rake-teeth is a drum 19, having a series of curved peripheral pick-up fingers 20, that operate near the surface-line of said teeth and gather up the hay or grain collected thereon. A shaft 21 on this revolving drum has suitable bearings on the frame 2 and is provided with a beveled gear 22, that meshes with a similar gear 23 on a shaft 24, which extends back to the rear of the machine. The rear end of the shaft 24 is provided with a beveled gear corresponding to the one at the forward end and meshing with the gear on a shaft 25, similar to the one on the shaft 21. The shaft 25 is driven from the axle 4 of the machine through a chain 26. Forward movement, therefore, of the machine over the field will rapidly revolve the drum and gather up the hay or straw, whether loose or in bundles, and toss the same over upon the rear of the machine-frame. To prevent the loose hay or straw from passing through between the teeth of the rake into the mechanism of the machine, I prefer to provide a flat plate 27, secured to the side of the rake-teeth beneath the revolving drum, and I also provide a curved guard or shield 28 in the rear of the drum to prevent the material from being thrown back into the wheels by action of the drum. A horizontal carrier 29 is transversely arranged on the frame 2 in the rear of the revolving drum in position to receive the hay or straw gathered up thereby, and at the discharge end of said carrier I prefer to provide an upwardly-inclined hinged carrier-frame 30, supporting a carrier 31, to which the material is delivered by said horizontal carrier and deposited upon a wagon 32. The discharge end of the carrier-frame 30 is raised or lowered by means of a windlass 33, connected by cables 34 with the outer end of said frame and mounted upon standards 35 near the receiving end of said frame. A guard-plate 36 is arranged on the rear side of the horizontal carrier to prevent the material gathered up by the drum from being thrown over said horizontal carrier.

Any suitable means may be provided for driving the horizontal and inclined carriers; but I prefer to provide belts 37 and 38, connecting the shafts of said carriers, respectively, with the shaft 24.

The operation of the machine is as follows: Horses being attached to the draft-bar 6, the apparatus is set in motion, and the operator, depressing the forward ends of the rake-teeth, will gather up the loose hay or grain thereon either in the swath or windrow and deliver it to the revolving pick-up fingers operating thereover. These fingers will toss the hay or grain over upon the horizontal carrier, and from there it will be delivered to the inclined carrier or the wagon or rack.

If preferred, the apparatus can be used for gathering up shocks of grain when it is desired to stack the bundles or transport them to a threshing-machine.

I claim as my invention—

1. The combination, with a wheeled frame, of a rake supported thereon and having its teeth projecting in front of said frame with their forward ends near the ground-line, and a revolving overshot drum operating above said teeth and arranged to gather up the material collected thereby.

2. The combination, with a wheeled frame of a pivoted rake having a series of forwardly-projecting fingers, a revolving overshot drum operating above said rake and a side delivery-carrier operating in the rear of said drum.

3. The combination, with a wheeled frame, of a rake-head pivotally supported from the axle and having a series of teeth, means for tilting said rake-head, and a revolving overshot drum operating above said teeth to gather up the material collected thereby.

4. The combination, with a wheeled frame of a rake having a series of teeth with their forward ends near the ground-line, a revolving overshot drum arranged above said rake to gather up the material thereon, a transversely-arranged carrier in the rear of said drum and a hinged side delivery-carrier arranged to receive the material from said first-named carrier.

5. The combination, with a wheeled frame, of a rake-head pivotally suspended from the axle of said frame, a rock-shaft, crank-arms connecting said rock-shaft and said rake-head, means for rocking said shaft to oscillate said rake-head and raise or lower the forward end thereof, a revolving overshot drum provided above said rake-head and a side delivery-carrier arranged to receive the material from said drum.

6. The combination, with a wheeled frame of a rake-head or sweep suspended beneath the same and having a series of forwardly-projecting teeth, a plate connecting said teeth, a revolving overshot drum provided above said rake, a guard-plate in the rear of said drum and a side delivery-carrier arranged to receive the material from said drum.

7. The combination, with a wheeled frame, of a rake suspended beneath the same and having its teeth forwardly projecting and near the ground-line, a revolving overshot drum operating above said teeth to gather up the material collected thereby, and a side delivery-carrier whereto the material is delivered from said teeth.

8. The combination, with a wheeled frame, of a rake-head or sweep extending beneath the same and having a series of forwardly-projecting teeth, a plate connecting said teeth, a revolving overshot drum having a series of pick-up fingers provided above said rake, and a side delivery-carrier operating in the rear of said drum.

9. The combination, with a wheeled frame, of a rake-head or sweep having a series of forwardly-projecting teeth, whose ends rest and slide upon the ground, a revolving overshot drum having a series of pick-up fingers provided above said rake, and a side delivery-carrier operating in the rear of said drum.

10. The combination, with a wheeled support, of a rake having a series of forwardly-projecting teeth, a revolving overshot drum located above said teeth, and a carrier operating in the rear of said drum.

11. A wheeled support and a rake having a series of substantially straight teeth with their forward ends arranged to rest and slide upon the ground, in combination with a revolving overshot member having a series of pick-up fingers operating above and in the rear of said forward ends.

In witness whereof I have hereunto set my hand this 23d day of October, 1903.

JOHN T. SMITH.

In presence of—
RICHARD PAUL,
CLARA G. HANSON.